United States Patent [19]

Lima

[11] Patent Number: 6,139,644
[45] Date of Patent: Oct. 31, 2000

[54] METHOD AND EQUIPMENT FOR LAUNCHING PIGS INTO UNDERSEA PIPES

[75] Inventor: Paulo Cesar Ribeiro Lima, Milton Keynes, United Kingdom

[73] Assignee: Petroleo Brasileiro S.A.-Petrobras, Brazil

[21] Appl. No.: 09/171,510

[22] PCT Filed: Mar. 11, 1997

[86] PCT No.: PCT/GB97/00721

§ 371 Date: Mar. 18, 1999

§ 102(e) Date: Mar. 18, 1999

[87] PCT Pub. No.: WO97/39273

PCT Pub. Date: Oct. 23, 1997

[30] Foreign Application Priority Data

Apr. 16, 1996 [BR] Brazil ................................ 9601401

[51] Int. Cl.[7] .............................. B08B 9/04; E21B 33/068
[52] U.S. Cl. ................. 134/8; 137/242; 137/268; 15/3.5; 15/3.51; 405/169; 405/170
[58] Field of Search ............... 134/8, 22.11, 22.12; 15/3.5, 3.51, 104.062; 137/242, 268; 405/169, 170

[56] References Cited

U.S. PATENT DOCUMENTS

| 3,562,014 | 2/1971 | Childers ............................. 134/8 |
| 3,777,812 | 12/1973 | Burkhardt ........................ 166/338 |
| 4,574,830 | 3/1986 | Rickey et al. .................... 137/242 |
| 5,435,338 | 7/1995 | Da Silva et al. ................. 137/242 |
| 5,437,302 | 8/1995 | Da Silva et al. ................. 137/242 |
| 5,460,227 | 10/1995 | Sidrim ............................. 166/357 |
| 5,842,816 | 12/1998 | Cunningham .................... 405/170 |

*Primary Examiner*—Randy Gulakowski
*Assistant Examiner*—Saeed Chaudhry
*Attorney, Agent, or Firm*—Nixon & Vanderhye PC

[57] ABSTRACT

This invention relates to a method and equipment whereby a pig (11) launched into a gas injection line (5) can be inserted into a hydrocarbon flow line (2) in a position close to the subsea wellhead or manifold (1) without interrupting the flow of hydrocarbons and with minimum interference to the process of gas injection.

8 Claims, 2 Drawing Sheets

METHOD AND EQUIPMENT FOR LAUNCHING PIGS INTO UNDERSEA PIPES

FIELD OF THE INVENTION

This invention relates to equipment and a method designed to enable scraper devices, known as pigs, to be passed through the interior of an undersea hydrocarbons flow line.

BACKGROUND OF THE INVENTION

The purpose of this invention is to provide equipment which will allow a scraper device to pass through a submarine hydrocarbon flow line. A branch located close to the wellhead or gathering line interconnects the gas injection line and the production flow lines.

This branch is designed in such a way that a scraper device placed within the gas injection line remains stationary at a particular point within the equipment. In order to insert the scraper device into the production flow line it is merely necessary to open a valve, provided in the equipment, which is controlled from a remote point. Passage of the scraper device through the interior of the production flow line will take place without interrupting the flow of injection gas.

PRIOR ART

The production from an oil well normally flows to a gathering station through pipes, which may be rigid or flexible. Frequently organic deposits accumulate on the internal walls of the piping, which causes a substantial loss of head in the piping, restricting the flow of oil and causing a fall in production.

Various techniques are used to remove these deposits. One of the best known is the use of scraper devices, known to those skilled in the art as 'pigs'. In the case of offshore oil production these pigs have a fundamental role because frequently they are the only economically viable means which can be used to remove the deposits.

Normally the pigs are launched from an offshore platform into the line through which high pressure gases are injected into the wells with a view to improving production, a technique known by those skilled in the art as gas-lift. To enable the pig to pass, devices are used which provide a connection between the gas injection flow line and the production flow line, but this normally gives rise to an undesirable interruption in the gas injection flow into the annulus of the well into which it is normally injected. As a consequence there is a fall in the production from the well.

U.S. Pat. No. 3,562,014 discloses a magazine for releasing pigs into a flow line from an undersea platform or template, using gas injection line from the surface to drive the leading pig of the magazine through a clear flow valve into the production line when the clear valve has been opened and the flow of injection gas into the magazine behind a pig has been initiated from the surface. Pigs are loaded into the magazine by reverse flow down a production line from the surface, while production in that line is suspended.

OBJECT OF THE INVENTION

It is an object of this invention to provide equipment and a method which makes it possible to pass the pig from the gas injection line to the production flow line with minimum interference in normal operation, without there being any need for the pig to be monitored.

SUMMARY OF THE INVENTION

This invention relates to equipment and a method designed to make it possible to introduce a pig into the oil production flow line either from an offshore well or from a manifold which gathers the production from various offshore wells.

A first aspect of the invention provides equipment for launching pigs into an undersea pipe of undersea hydrocarbon flow system, comprising the following components:

a first length of pipe which one of the its ends is connected to a first gas injection line and its other end is connected to a U-shaped second length of pipe which is in turn connected to a production flow line;

a clear flow shut-off valve located in said first length of pipe at a region close to and in front of the connection between said first pipe length and the U-shaped second pipe length; and first and second branches which connect said first pipe length to a second gas injection line and having means to prevent passage of a pig into them;

characterized in that said first and second branches connecting said first pipe length to said second gas injection line form a section in said first pipe length, between the point of connection of said first and second branches to said first pipe length, where a pig becomes immobilized when launched into said section.

A second aspect of the invention provides a method for launching a pig into un undersea pipe of un undersea hydrocarbon flow line system, comprising the following steps:

insertion of a pig into a first gas injection line;

driving the pig, by the flow of pressurized gas through the first gas injection line to travel along the first gas injection line until it reaches a first pipe length;

preventing the pig from entering a first branch joined to the first pipe length, so the pig is obliged to continue its travel along the interior of the first pipe length;

immobilizing the pig in a section of the first pipe length between the first branch and a second branch; and when it is desirable that the pig should enter a production flow line, opening a clear flow shut-off valve to allow a small drop in pressure to be produced in the region of the first pipe length downstream the pig to force the pig to move towards a U-shaped second pipe length for introducing the pig into said production flow line;

characterized in that said immobilization of the pig is effected by as soon as the pig passes by said first branch allowing the pressures in said first and second branches to equalize, the pig being prevented from entering said first branch by means of a first grating.

Thus when it is desired to insert the pig into the production flow line it is only necessary to open the clear flow shut-off valve for a few moments, to give rise to a reduction in pressure downstream from the pig. As a consequence, driven by the flow of gas, the pig resumes its motion and passes through the clear flow shut-off valve and through the U-shaped second length of pipe and is inserted into the production flow line. The clear flow shut-off valve is then closed, re-establishing normal operating conditions.

BRIEF DESCRIPTION OF THE DRAWINGS

The characteristics of this invention will be better understood from the following detailed description given merely by way of example, with reference to the accompanying drawings which form an integral part of this description. In the drawings.

DETAILED DESCRIPTION OF A PREFERRED EMBODIMENT

Figure 1:
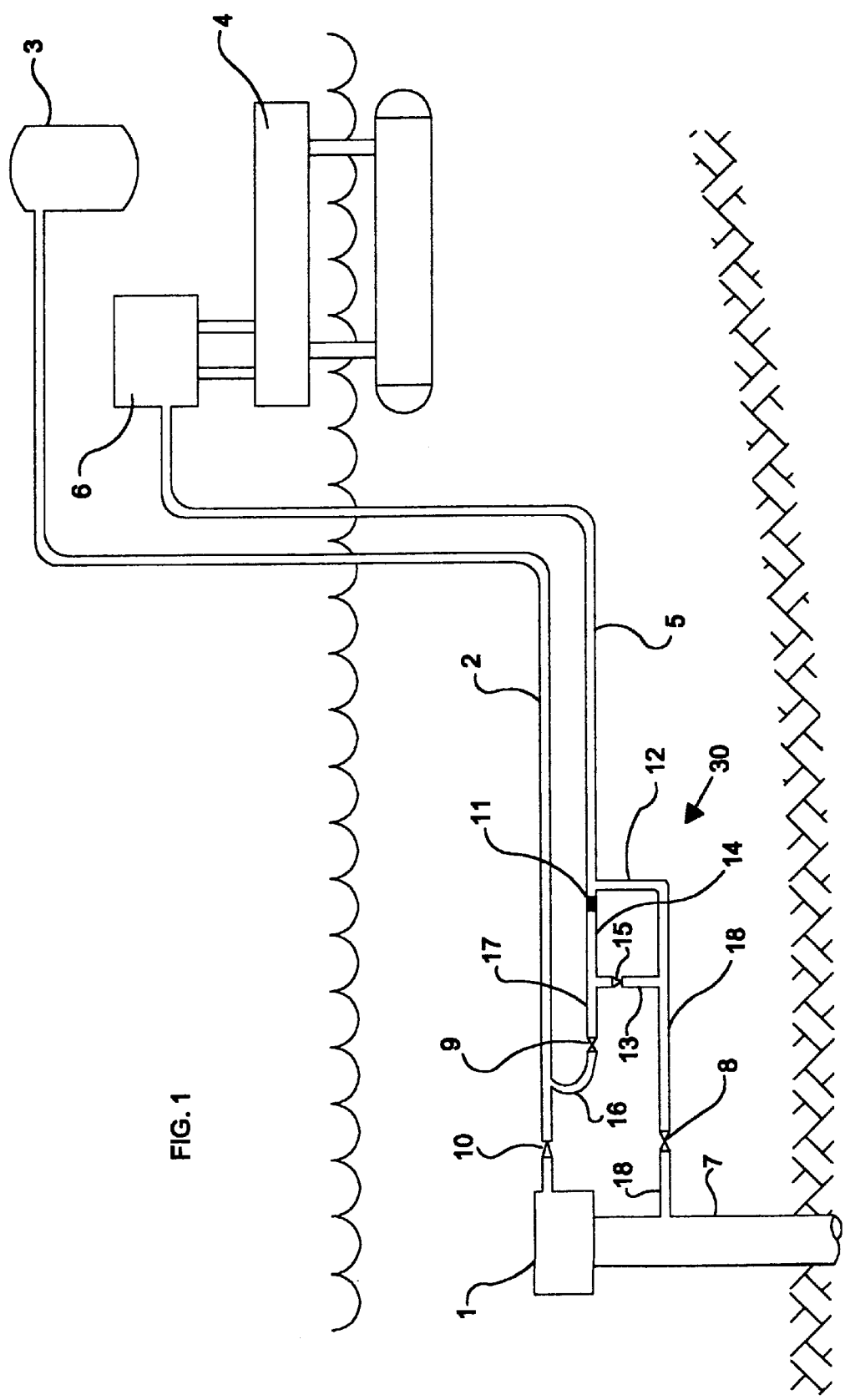
FIG. 1 is a diagrammatical representation of a production system using the equipment according to this invention.

FIG. 1 provides a diagrammatic view of a production system which uses an equipment according to this invention. This shows a wellhead 1 connected to a production flow line 2, which is in turn connected to a separation and treatment assembly represented by a tank 3 located on a platform 4. The production flow line 2 has a first check valve 10 located at a point close to the point of connection of the production flow line 2 to the wellhead 1.

In the embodiment now described it is assumed, merely by way of example, that the separation and treatment assembly represented by the tank 3 will be located on the platform 4, as this is the most common situation. However, there is nothing to prevent the separation and treatment assembly being located on any type of marine vessel, or even onshore.

Again with reference to FIG. 1, it will be seen that there is a first gas injection line 5, this being the line which delivers high pressure gas generated by a compression system 6 to a point where an equipment 30 according to this invention is located. A second gas injection line 18 delivers the high pressure injection gas, which passes trough the equipment 30, to an annulus 7 of the well. This second gas injection line 18 is fitted with a shut-off valve 8. In the embodiment here proposed, the compression system 6 is also located on the platform 4.

Figure 2:
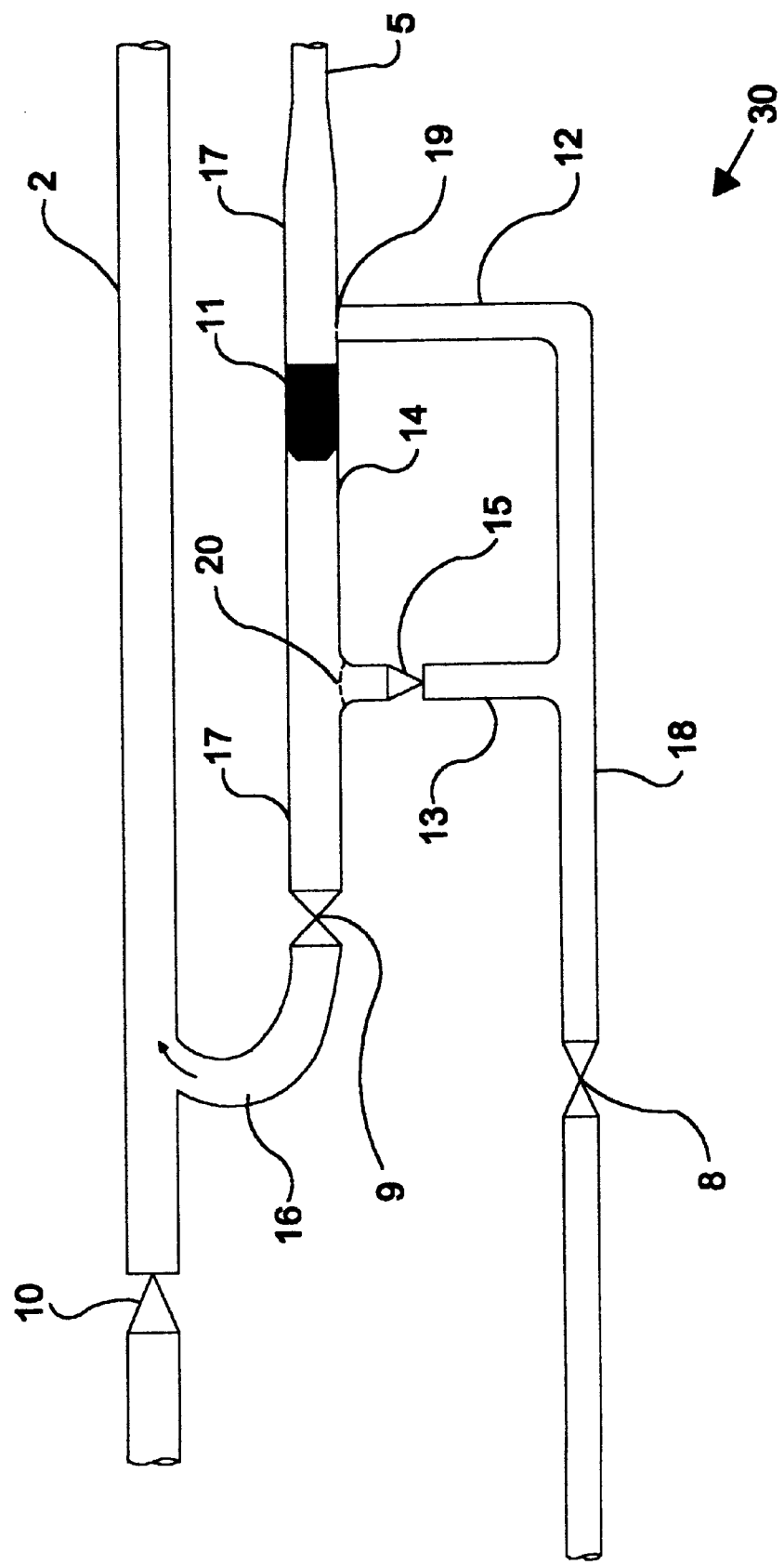
FIG. 2 is a detail showing the equipment according to this invention.

The equipment 30 of this invention, which may be better seen in FIG. 2, basically comprises a first length of pipe 17 which is connected at one of its two ends to the first gas injection line 5 and at the other end to a second, U-shaped length of pipe 16 which is in turn connected to the production flow line 2. It will be seen that there is a clear flow shut-off valve 9 located at a point close to the connection between the first pipe length 17 and the second, U-shaped pipe length 16. The term "clear flow" indicates that when the valve 9 is fully open the a pig 11 can pass through it.

First and second branches 12 and 13 connect the first pipe length 17 to the second gas injection line 18. These branches have means to prevent the pig from passing into them. In this embodiment first and second gratings 19 and 20, respectively installed in first and second branches 12 and 13, are used. First and second gratings 19 and 20 are shaped so as to keep a continuous cylindrical profile for the first pipe length 17 at the points where it connects with first and second branches 12 and 13, thus ensuring free passage of the pig 11 past these points of connection. In the embodiment here proposed, the branch 12 also has a second check valve 15.

As explained above with reference to FIG. 1, the second gas injection line 18 has the shut-off valve 8. The normal operating condition of the equipment according to the invention is that the clear flow shut-off valve 9 is closed and the shut-off valve 8 is open to allow flow of injection gas into the second injection line 18.

The method of using the equipment according to this invention begins with the insertion of the pig 11 into a launching device (not shown), located on the platform 4, through which the pig 11 is launched into the first gas injection line 5. The launching device is not described here as it does not form part of this invention and is in any case well known to those skilled in the art.

Driven by the flow of high pressure gas, the pig 11 travels along the interior of the first gas injection line 5 until it reaches the first pipe length 17 of the equipment 30. Because entry of the pig 11 into first branch 12 is prevented by the first grating 19, the pig 11 is compelled to continue its travel along the first pipe length 17. As soon as the pig 11 passes by the end of the branch 12, the pressures in the first and second branches 12 and 13 are equalized and the pig 11 becomes immobilized in a region 14 of the first pipe length 17 between the first and second branches 12 and 13.

When it is desired that the pig 11 should enter the production flow line 2, it is necessary only to open the clear flow shut-off valve 9. When this valve opens a slight fall in pressure will occur in the region downstream from the pig 11, which causes it to move towards the second, U-shaped pipe length 16, causing the pig to be introduced into the production flow line 2. Second grating 20 prevents the pig 11 from passing into second branch 13.

Situations may arise where, because of a small pressure differential between the flow of injection gas and the flow of produced hydrocarbons in the production flow line 2, the pig 11 may remain stationary in the region 14 of first pipe length 17. In such a situation the flow of gas may enter the pipe length 17, pass through the first branch 12 into the second gas injection line 18, and then return to the first pipe length 17 through the second branch 13, and continue along the production flow line 2 having made a diversion around the pig 11.

In order to avoid such situations it is suggested in this embodiment that the second check valve 15 be located in the second branch 13, to prevent the flow of gas from the second gas injection line 18 to the first pipe length 17. The second check valve 15 is optional, but its use is to be recommended.

The clear flow shut-off valve 9 remains open for a predetermined short period which is sufficient to allow the passage of the pig 11 into the production flow line 2. The opening and closing of the clear flow shut-off valve 9 is controlled remotely. Merely for the purposes of simplification, the valve control lines have not been shown in the Figures.

Situations may also arise in which the diameters of the first gas injection line 5 and of the production flow line 2 are different. In these situations a pig of easily deformable material, such as for example that suggested in EP-A-0581616, should be used.

It will be understood that as the pig is an extremely deformable and flexible item it can be introduced into a gas injection line which has a diameter smaller than that of the first pipe length 17 in the equipment 30. On reaching the first pipe length 17 the pig readily matches the new diameter.

The equipment according to the invention may also without any difficulty be extended to oil production flow lines from offshore manifolds.

It should be understood that the embodiment described merely has the purpose of demonstrating how the parts are combined together in order to obtain the effect intended by the invention, and should not be taken as any form of restriction as regards dimensions, materials and arrangements in general.

What is claimed is:

1. Equipment for launching pigs into an undersea pipe of an undersea hydrocarbon flow line system, comprising:

a first length of pipe connected at one end thereof to a first gas injection flow line and connected at another end thereof to a second U-shaped length of pipe which is in turn connected to a production flow line having a first check valve located near to a point of connection of said production flow line to a wellhead;

a clear flow shut-off valve located in said first pipe length at a region close to and in front of the connection between said first pipe length and said second U-shaped pipe length; and first and second branches which connect said first pipe length to a second gas injection line connected at one end thereof to an annulus of a well, said first and second branches having means for preventing passage of a pig thereinto;

wherein said first and second branches connecting said first pipe length to said second gas injection line from a section in said first pipe length, between the point of connection of said first and second branches to said first pipe length, in which a pig becomes immobilized when launched into said section.

2. Equipment according to claim 1, further comprising a second check valve fitted in said second branch.

3. Equipment according to claim 2, wherein said means for preventing passage of a pig into said first and second branches comprise first and second gratings respectively mounted to said first and second branches at the point where first and second branches connect said first pipe length.

4. Equipment according to claim 1, wherein said means for preventing passage of a pig into said first and second branches comprise first and second gratings respectively mounted to said first and second branches at the point where first and second branches connect said first pipe length.

5. A method for launching pigs into an undersea pipe of an undersea hydrocarbon flow line system, comprising:

inserting a pig into a first gas injection line;

driving the pig, by the flow of pressurized gas through the first gas injection line to travel along the first gas injection line until it reaches a first pipe length;

preventing the pig from entering a first branch joined to the first pipe length, so the pig must continue traveling along the interior of the first pipe length;

immobilizing the pig in a section of the first pipe length between the first branch and a second branch; and selectively opening a clear flow shut-off valve to allow a small drop in pressure to be produced in the region of the first pipe length downstream from the pig to force the pig to move towards a U-shaped second pipe length for introducing the pig into said production flow line;

wherein said immobilization of the pig is effected by, as soon as the pig passes by said first branch, allowing the pressures in said first and second branches to equalize, wherein the pig is prevented from entering said first branch by means of a first grating; and wherein, when the pig is forced to move towards a U-shaped second length of pipe by means of said drop in the pressure caused by opening of said clear flow shut-off valve, a second grating prevents the pig from entering into said second branch, thereby allowing the pig to continue towards said U-shaped second length of pipe.

6. A method according to claim 5, wherein the opening of said clear flow shut-off valve is of a brief duration to allow the pig to move past said clear flow shut-off valve, whereupon said clear flow shut-off valve is again closed.

7. A method according to claim 6, further including using a second check valve in said second branch to prevent the flow of injection gas from the second gas injection line into said first pipe length ahead of the pig while the pig is immobilized in said region between first and second branches.

8. A method according to claim 5, further including using a second check valve in said second branch to prevent the flow of injection gas from the second gas injection line into said first pipe length ahead of the pig while the pig is immobilized in said region between first and second branches.

* * * * *